(12) United States Patent
Liang

(10) Patent No.: US 6,724,621 B1
(45) Date of Patent: Apr. 20, 2004

(54) PORTABLE HARD DISK DRIVE CARTRIDGE HAVING ADAPTABLE INTERFACE

(75) Inventor: Shun Ying Liang, Taoyuan Hsien (TW)

(73) Assignee: T-Win Sheet Metal Co., Ltd., Taoyuan Hsien (TW)

( * ) Notice: Subject to any disclaimer, the term of this patent is extended or adjusted under 35 U.S.C. 154(b) by 0 days.

(21) Appl. No.: 10/314,172

(22) Filed: Dec. 9, 2002

(51) Int. Cl.[7] .................................................. H05K 5/00
(52) U.S. Cl. ......................................... 361/685; 369/76
(58) Field of Search ................................ 361/684, 685, 361/686; 312/332.1, 333; 369/75.1, 75.2, 76, 77.1, 78–82

(56) References Cited

U.S. PATENT DOCUMENTS

| | | | | |
|---|---|---|---|---|
| RE34,369 E | * | 9/1993 | Darden et al. | 439/377 |
| 5,579,204 A | * | 11/1996 | Nelson et al. | 361/685 |
| 6,634,909 B2 | * | 10/2003 | Lin | 439/638 |
| 2003/0151891 A1 | * | 8/2003 | Paul | 361/685 |

* cited by examiner

Primary Examiner—Dean A. Reichard
Assistant Examiner—Carmelo Oliva
(74) Attorney, Agent, or Firm—Troxell Law Office PLLC

(57) ABSTRACT

A portable hard disk drive cartridge comprises a housing defining a receiving space for positioning a hard disk drive therein. The housing further includes a rear bracket detachable attached to the housing. A first substrate having connectors thereon for electrically connecting with connectors of the hard disk drive is attached to the rear bracket. A second substrate electrically is electrically connected to the first substrate and mounted on the other side of the rear bracket. Wherein at least one of the first and second substrates is adjustably attached to the rear bracket so as to make an adjustment along a horizontal direction to mate hard disk drive from different manufacturers.

6 Claims, 3 Drawing Sheets

PORTABLE HARD DISK DRIVE CARTRIDGE HAVING ADAPTABLE INTERFACE

FIELD OF THE INVENTION

The present invention relates to a portable hard disk drive cartridge, and more particularly to a hard disk cartridge having adaptable interface so as to mate with different hard disk from different brand name.

DESCRIPTION OF THE PRIOR ART

The hard disk drive (HDD) is standard equipment for personal computer, server or industrial computer. In order to easily make copy for security reason, portable along with information manager, or replace a new one when the old one is malfunctioned, a HDD mobile rack is provided to meet such a requirement.

In a typical HDD, it is provided with connectors for signal transmission as well as power transmission. In general, the HDD is provided with headers for signal transmission as well as power connector for receiving power from a switching power supply mounted within a computer. Generally, the HDD is electrically connected with a motherboard of the computer by means of a signal cable assembly and a power cable assembly interconnected between the motherboard and the switching power supply.

The conventional HDD mobile rack generally includes a cartridge in which the HDD can be fixedly supported therein, and a rack mounted within a HDD mounting bracket of an enclosure of the computer. The cartridge is provided with an interface on a rear bracket thereof and which includes first female connectors for interconnecting signal and power connectors of mounted HDD, and second male connectors for electrical connecting with the cable assembly mounted on the bracket. Accordingly, when the cartridge is inserted along the rack and finally reaches to its final position, an electrical connection between the HDD and the motherboard is established.

However, the HDD is not a standardized product, the signal and power connectors on the rear portion thereof from one company are slightly different from a second company. Even the positions of the connectors are same, there is a difference around five (5) mm. along a horizontal direction. In order overcome this inconvenience, the first connectors are mounted to the cartridge by means of a cable so as to compensate the five mm variation.

It can be easily understood that when a cable assembly is involved during the manufacturing of the cartridge, the cost is increased inevitably. In addition, malfunction will be experienced resulted from poor electrical connection. One of the solution is to attach the first female connectors directly on a printed circuit board so as to overcome the inconvenience resulted from using cable assembly. However, as the position of the connectors in the printed circuit board is fixed with respect to a certain HDD from a certain manufacturer, a HDD from a second manufacturer will certainly not mate to the connectors on the printed circuit board because of the horizontal variation of the connectors on the HDD. In order to overcome this inconvenience, there has to be many different printed circuit board for different HDD from different manufacturer. This is really not an appropriate solution. Accordingly, there is still a room for providing a better solution for the a HDD mobile cartridge so as to receive HDD from different manufacturers without making different printed circuit board. According to my observation, there are three typical dimension in arranging the signal and power connectors on the rear end of the HDD among the manufacturers. As such, an improvement is provided.

SUMMARY OF THE INVENTION

It is an object of this invention to provide a portable hard disk drive cartridge adapted to receive different HDD from different manufacturers.

In order to achieve the object set forth, a portable hard disk drive cartridge in which an adapting device is provided on a rear bracket thereof such that printed circuit boards having connectors mate able with HDD connectors can be readily adjusted along a horizontal direction so as to electrically receive different HDD therein.

According to one aspect of the present invention, a printed circuit board is adjustably mounted on a rear bracket of the cartridge.

DETAILED DESCRIPTION OF PREFERRED EMBODIMENT

Figure 1:
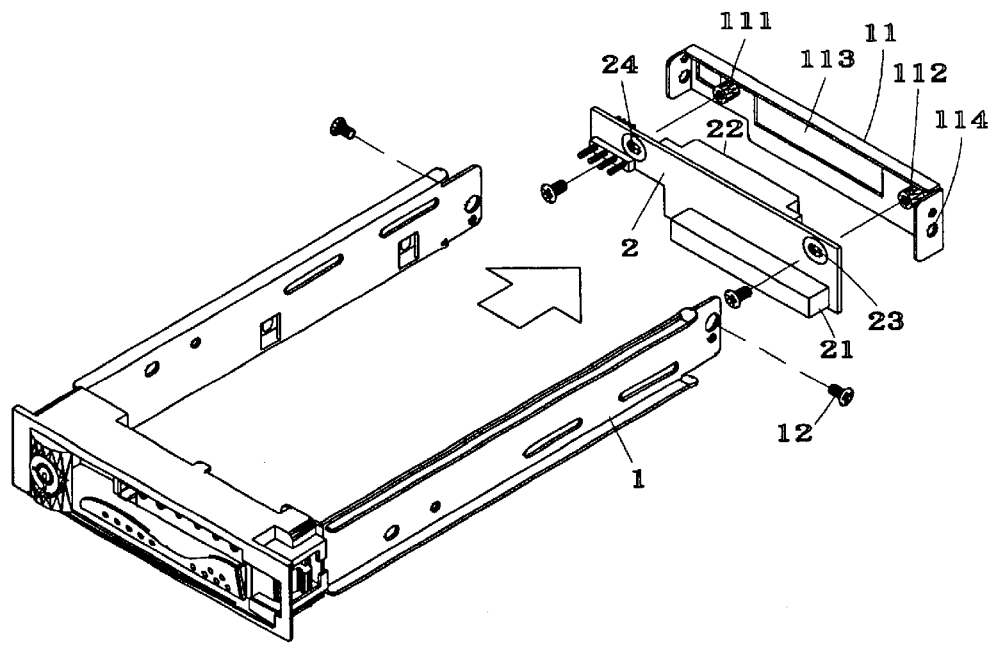
FIG. 1 is an exploded view showing a cartridge, a rear bracket detached from the cartridge, and a printed circuit board adapted to be mounted to the real wall in accordance with the present invention.
Figure 2:
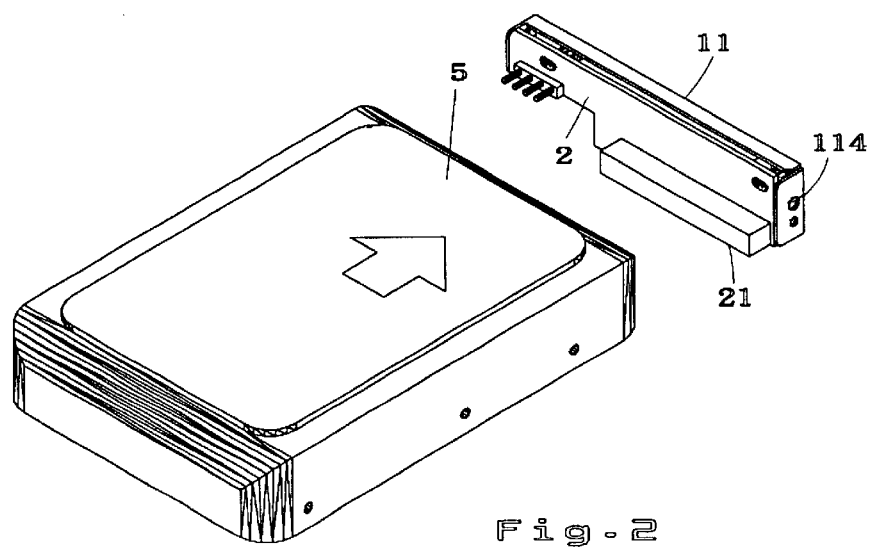
FIG. 2 is an assembled view of FIG. 1.
Figure 3:
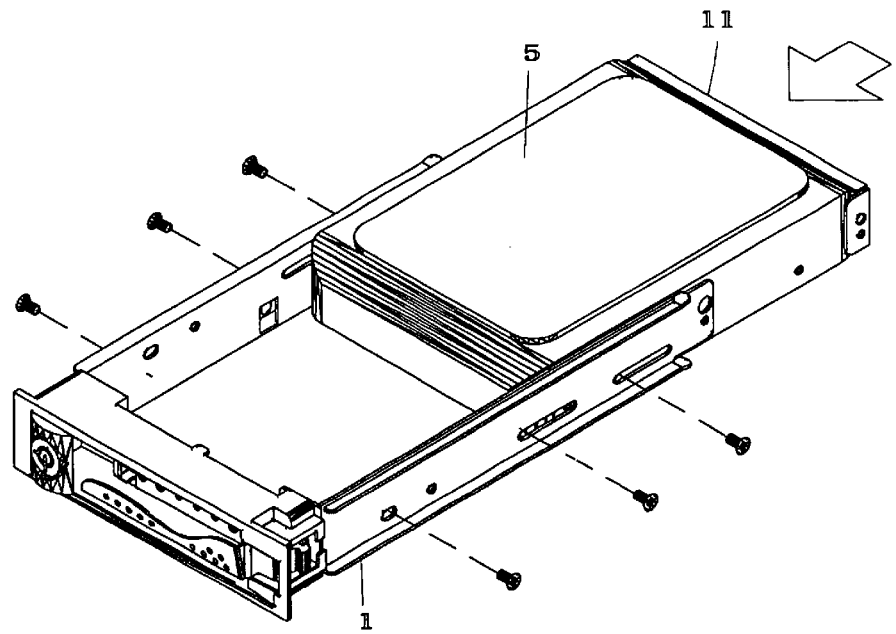
FIG. 3 is similar to FIG. 2 with a HDD mounted therein.

Referring to FIGS. 1, 2 and 3, the cartridge 1 in accordance with the present invention includes a housing with a rear bracket 11 attached to thereto by means of screws 12. The rear bracket 11 is provided with a pair of studs 111, 112 and passageways 113 for terminals. The rear bracket 11 is further provided with positioning hole 114.

Figure 5:
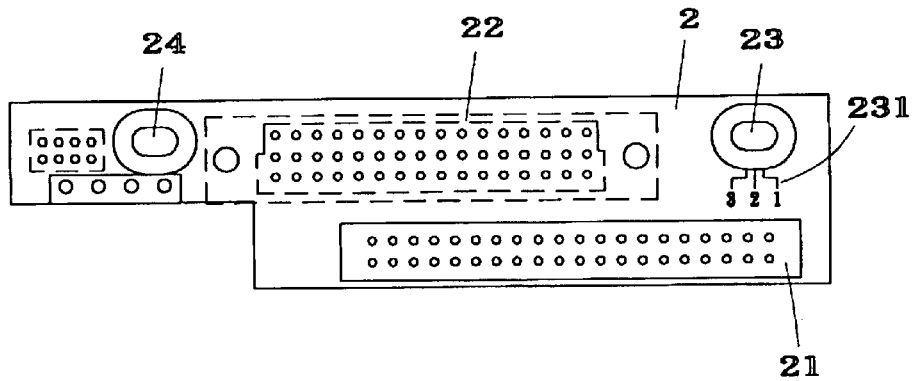
FIG. 5 is a front view of a first printed circuit board mounted on a first side of the rear bracket.

As shown in FIGS. 1, 2 and 5, the first printed circuit board 2 to be mounted on an inner wall of the rear bracket 11 is mounted with female connectors 21 adapted to be electrically connected with headers of a HDD. The first printed circuit board 2 is further provided with female terminals 22 for electrical connection with an external box. The first printed circuit board 2 is further provided with a pair of oval holes 23, 24 with at least is marked with a coordinate 231. By this arrangement, the first printed circuit board 2 can be attached to the rear bracket 11 with the female terminals 22 extending rearward through the passageways 113. As a result, the first printed circuit board 2 can be adjusted along a horizontal direction because of the oval holes 23, 24 with respect to the rear bracket 11.

Figure 4:
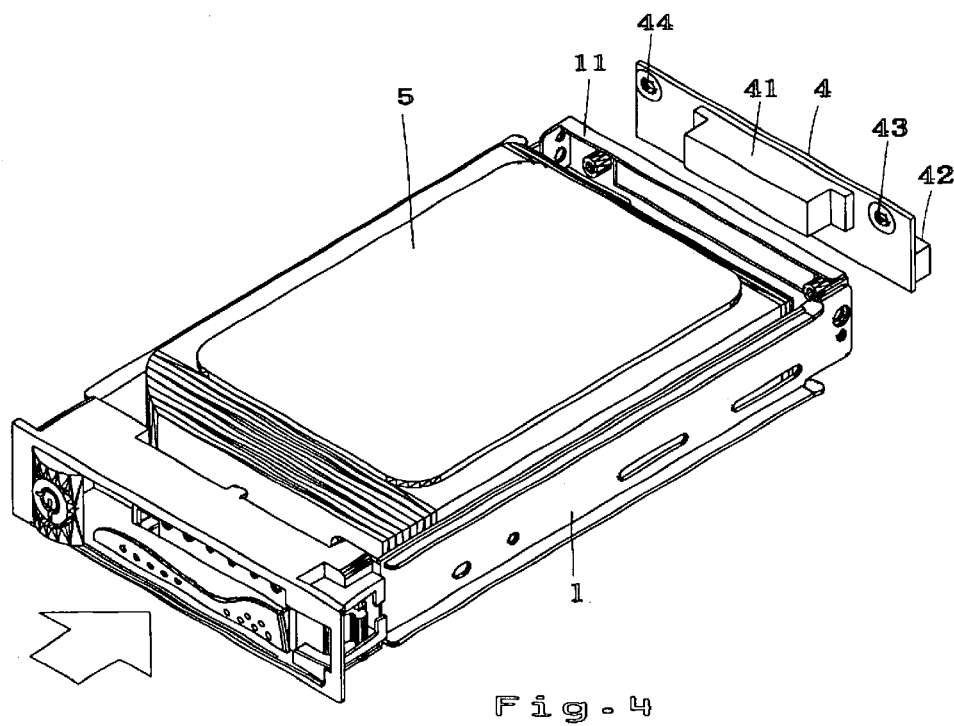
FIG. 4 is similar to FIG. 3 with the printed circuit boards detached from the HDD.
Figure 6:
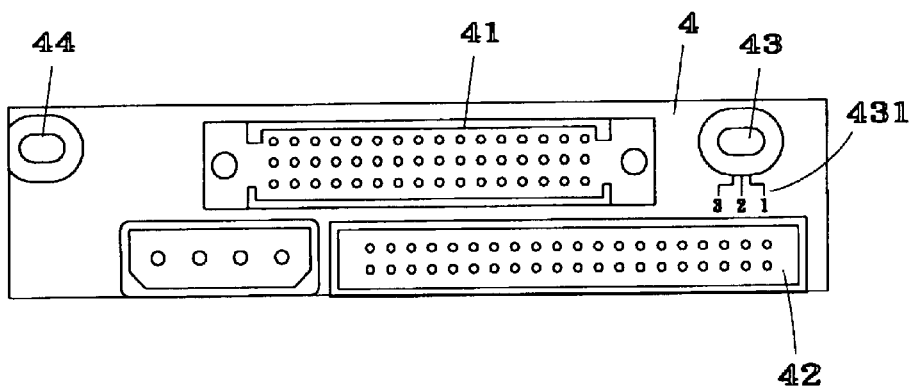
FIG. 6 is a front view of a second printed circuit board mounted to the other side of the rear bracket.

Referring to FIGS. 4 and 6, a second printed circuit board 4 to be attached to an outer wall of the rear bracket 11 is provided. The second printed circuit board 4 is provided with female terminals 41 to be electrically connected to the male terminals 22. The second printed circuit board 4 is further provided with female terminals 42 to be electrically mated with socket connector of a cable assembly extended from a motherboard (not shown). The second printed circuit board 4 is also provided with a pair of oval holes 43, 44, which serve the same function as the oval holes 23, 24 of the first printed circuit board 2. The second printed circuit board 4 is further provided with coordinate 431.

By this arrangement, by the provision of the first and second printed circuit boards 2 and 4 adjustably mounted on the rear bracket 11 with respect to different HDD 5, the connectors of the HDD can be accurately aligned with the connectors on the printed circuit boards 2, 4 thereby facilitating easy installment of the HDD to the cartridge 1 in accordance with the present invention.

I claim:

1. A portable hard disk drive cartridge, comprising
   a housing defining a receiving space for positioning a hard disk drive therein, the housing further including a rear bracket detachable attached to the housing;
   a first substrate attached to the rear bracket and having connectors thereon for electrically connecting with connectors of the hard disk drive; and
   a second substrate attached to the other side of the rear bracket and electrically connected to the first substrate;
   wherein at least one of the first and second substrates is adjustably attached to the rear bracket so as to make an adjustment along a horizontal direction to mate hard disk drive from different manufacturers.

2. The portable hard disk drive as recited in claim 1, wherein the first substrate includes a pair of oval holes so as to make horizontal adjustment.

3. The portable hard disk drive as recited in claim 1, wherein the second substrate includes a pair of oval holes for facilitating horizontal adjustment.

4. The portable hard disk drive as recited in claim 1, wherein the rear bracket is attached to the housing by means of screws.

5. The portable hard disk drive as recited in claim 1, wherein the first and second substrate is provided with coordinates.

6. The portable hard drive as recited in claim 1, wherein the first and second substrates are electrically connected through male and female terminals.

* * * * *